United States Patent
Shimada et al.

(10) Patent No.: US 12,126,153 B2
(45) Date of Patent: Oct. 22, 2024

(54) SPLICED CABLE, IN PARTICULAR A HIGH-VOLTAGE SPLICED CABLE, AND A METHOD OF SPLICING A CABLE, IN PARTICULAR A HIGH-VOLTAGE CABLE

(71) Applicant: SUMITOMO WIRING SYSTEMS, LTD., Yokkaichi (JP)

(72) Inventors: Takanobu Shimada, Braunschweig (DE); Ventsislav Mironov, Wolfsburg (DE)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 123 days.

(21) Appl. No.: 18/017,788

(22) PCT Filed: Jul. 27, 2021

(86) PCT No.: PCT/JP2021/027711
§ 371 (c)(1),
(2) Date: Jan. 24, 2023

(87) PCT Pub. No.: WO2022/025047
PCT Pub. Date: Feb. 3, 2022

(65) Prior Publication Data
US 2023/0291194 A1 Sep. 14, 2023

(30) Foreign Application Priority Data

Jul. 29, 2020 (DE) ..................... 10 2020 004 613.4

(51) Int. Cl.
*H02G 15/18* (2006.01)
*B60R 16/02* (2006.01)
(Continued)

(52) U.S. Cl.
CPC .......... *H02G 15/18* (2013.01); *B60R 16/0215* (2013.01); *H02G 15/10* (2013.01); *H02G 1/005* (2013.01)

(58) Field of Classification Search
CPC ...... H02G 15/10; H02G 15/18; H02G 15/196; H02G 1/005; B60R 16/0215
See application file for complete search history.

(56) References Cited

U.S. PATENT DOCUMENTS 11,404,856 B2 * 8/2022 Bak ..................... H02G 15/046
2009/0065237 A1   3/2009 Evoniuk et al.
(Continued)

FOREIGN PATENT DOCUMENTS

EP    0 136 154 A2    4/1985
WO    99/21259 A1     4/1999

OTHER PUBLICATIONS

Oct. 25, 2021 Search Report issued in International Patent Application No. PCT/JP2021/027711.
(Continued)

*Primary Examiner* — Paresh Paghadal
(74) *Attorney, Agent, or Firm* — Oliff PLC

(57) ABSTRACT

A spliced cable including: a first shielded wire, wherein the first shielded wire comprises at least one conductor and a first shield layer having an outer surface coated with a first outer sheath; a second shielded wire, wherein the second shielded wire comprises at least one conductor and a second shield layer having an outer surface coated with a second outer sheath; a third shielded wire, wherein the third shielded wire comprises at least one conductor and a third shield layer having an outer surface coated with a third outer sheath; wherein the first conductor is electrically connected to the second conductor and to the third conductor; and a flexible shield tube, wherein the flexible shield tube com-
(Continued)

prises a first portion and a second portion longitudinally adjacent or spaced from the first portion.

14 Claims, 6 Drawing Sheets

(51) Int. Cl.
    *H02G 15/10*     (2006.01)
    *H02G 1/00*     (2006.01)

(56) References Cited

U.S. PATENT DOCUMENTS

| | | |
|---|---|---|
| 2018/0233833 A1* | 8/2018 | Shanbhag ............... H01R 11/11 |
| 2018/0331528 A1 | 11/2018 | Takahashi |
| 2019/0199079 A1 | 6/2019 | Specht et al. |
| 2022/0140538 A1* | 5/2022 | Takahashi ............ H01B 7/0045 |
| | | 174/72 A |

OTHER PUBLICATIONS

Jun. 2, 2022 International Preliminary Report on Patentability issued in International Patent Application No. PCT/JP2021/027711.

* cited by examiner

SPLICED CABLE, IN PARTICULAR A HIGH-VOLTAGE SPLICED CABLE, AND A METHOD OF SPLICING A CABLE, IN PARTICULAR A HIGH-VOLTAGE CABLE

BACKGROUND

The present disclosure relates to a spliced cable, in particular a high-voltage shielded spliced cable, and to a method of splicing a cable, in particular a high-voltage shielded cable.

A shielded wire, or shielded cable, is an electrical cable comprising one or more insulated conductors that are enclosed by a common shield layer. The shield layer is configured to shield the insulated conductors from the electromagnetic noise. In particular, the shield layer allows suppressing electromagnetic noise influence that may affect signals as well as interfere with devices and apparatuses in electrical connection with the cable. The shield layer may be a of braided tube comprising a plurality of braided strands made of Copper, Copper Alloy, Aluminum, or Aluminum alloy. Alternatively, the shield layer may be a non-braided spiral winding of copper tape, or a layer of conducting polymer. The shield layer is usually covered by an outer sheath jacket corresponding to the outermost layer of the shielded wire.

SUMMARY

Shielded wires are commonly used in high-voltage wire harness of vehicles for suppressing electromagnetic noise influence. In order to simplify the circuit structure, cable splices are often formed. The cable splices form a branch in a high voltage circuit. Due to the layered structure of the shielded wires that comprise at least one conductor and a conductive shield layer, however, it is not possible to create a spliced cable with high voltage shielded cables, particularly adopting conventional cables splicing techniques. In fact, according to conventional splicing techniques, it is only possible to connect the conductors of non-shielded wires.

However, a technique for splicing high voltage shielded cables is known. According to this known technique, a rigid metal housing is used for electrically connecting the shield layers. The rigid metal housing, that is generally shaped by a deep drawing or die casting process, is provided so as to cover the isolated, electrically-connected conductors. The rigid metal housing allows creating an electrical connection between the shield layers of the shielded cables at the splice. The rigid metal housing is also mechanically connected to the shielded cables by crimped connectors. Additionally, underneath the rigid metal housing, a plastic housing is usually provided in order to encase and electrically isolate the conductors from the shield layers. Finally, a waterproofing element is provided for covering the metal housing, rendering the spliced cable waterproofed. The waterproofing element may be connected to the metal housing by rubber seals.

A drawback of the above described conventional splicing technique is related to the rigid metal housing that is used to electrically connect the shield layers in the spliced cable. Due to the rigid structure of the metal housing, the shape of the splice is determined by the shape of the metal housing. In other words, the rigid metal housing cannot be used for splicing cables that are arranged according to an arrangement that differs from the design and/or shape of the metal housing. For example, if the metal housing is specifically designed to splice three cables, wherein two cables are arranged to form an angle of 30° therebetween, the same metal housing cannot be used for splicing cables arranged to form a different angle, e.g. 60°. In summary, the rigid metal housing used in conventional splicing techniques cannot be easily adapted for splicing shielded cables having arrangements that differ from the design and/or shape of the metal housing.

A further drawback of the conventional splicing technique is related to large number of components that are employed for splicing the shielded cables. According to the above-mentioned technique, the conductors are firstly electrically connected. Afterward, a first plastic housing is provided for encasing and electrically isolating the conductors from the shield layers. The plastic housing is usually formed by a couple of complementary shells that are connected to each other by adhesive, i.e. glue, or mechanical means, e.g. screws. A rigid metal housing is then provided for covering the isolated, electrically connected conductors, and the plastic housing. The rigid metal housing is connected to the shield layers by crimped connectors. Finally, a waterproofing element is arranged to cover the rigid metal housing. Clearly, in the above-mentioned known splicing technique, many assembly-components as well as steps are necessary for splicing the shielded cables.

An exemplary aspect of the disclosure allows for a more efficient production of a spliced cable, in particular a high-voltage spliced cable, and of a respective electric circuit and vehicle provided therewith.

According to an aspect, there is provided a spliced cable, in particular a spliced high voltage cable, comprising a first shielded wire, wherein the first shielded wire comprises at least one conductor and a first shield layer having an outer surface coated with a first outer sheath; a second shielded wire, wherein the second shielded wire comprises at least one conductor and a second shield layer having an outer surface coated with a second outer sheath; a third shielded wire, wherein the third shielded wire comprises at least one conductor and a third shield layer having an outer surface coated with a third outer sheath; wherein the first conductor is electrically connected to the second conductor and to the third conductor; and a flexible shield tube, wherein the flexible shield tube comprises a first portion and a second portion longitudinally adjacent or spaced from the first portion, wherein the first portion of the flexible shield tube is disposed to substantially encase an exposed portion of the first shielded wire and is electrically connected to the first shield layer, and wherein the second portion of the flexible shield tube is disposed to substantially encase both an exposed portion of the second shielded wire and an exposed portion of the of the third shielded wire and is electrically connected to the second shield layer and the third shield layer. According to an embodiment, the flexible shield tube may be a braided tube. Advantageously, a flexible shield braided tube can connect any shield layer independently from the arrangement of the shielded wires.

Particularly, the second shielded wire and the third shielded wire may be arranged substantially adjacently and/or parallel to each other. Advantageously, this arrangement prevents, or at least reduces, the damaging of the shielded wires connected by the spliced cable.

Further particularly, the exposed portion of the first shielded wire may comprise a portion of the first shield layer where the first outer sheath is stripped so as to expose the outer surface of the first shield layer, wherein the portion of the first shield layer where the first outer sheath is stripped may be interposed between a couple of portions of the first shield layer that are coated with the first outer sheath, and wherein an inner surface of the flexible shield tube may be disposed to substantially abut the outer surface of the first shield layer at the exposed portion; and/or the exposed portion of the second shielded wire may comprise a portion of the second shield layer where the second outer sheath is stripped so as to expose the outer surface of the second shield layer, wherein the portion of the second shield layer where the second outer sheath is stripped is interposed between a couple of portions of the second shield layer that are coated with the second outer sheath, and wherein an inner surface of the flexible shield tube may be disposed to substantially abut the outer surface of the second shield layer at the exposed portion; and/or the exposed portion of the third shielded wire may comprise a portion of the third shield layer where the third outer sheath is stripped so as to expose the outer surface of the third shield layer, wherein the portion of the third shield layer where the third outer sheath is stripped is interposed between a couple of portions of the third shield layer that are coated with the third outer sheath, and wherein an inner surface of the flexible shield tube may be disposed to substantially abut the outer surface of the third shield layer at the exposed portion.

Further particularly, the spliced cable may comprise at least one connecting element, wherein the connecting element may be configured to mechanically and/or electrically connect the flexible shield tube to the first shielded wire, the second shielded wire and the third shielded wire.

Further particularly, the connecting element may comprise at least one first adhesive tape and/or at least one second adhesive tape. The first adhesive tape may be configured to encase at least a portion of the outer surface of the flexible shield tube and at least a portion of an outer surface of the first outer sheath so as to mechanically and/or electrically connect the flexible shield tube to the first shielded wire; and wherein the second adhesive tape may be configured to encase at least a portion of the outer surface of the flexible shield tube and at least a portion of an outer surface of the second outer sheath and at least a portion an outer surface of the third outer sheath so as to mechanically and/or electrically connect the flexible shield tube to the second shielded wire and to the third shielded wire. Advantageously, the connection process between the flexible shield tube and the shield layers is simplified.

Further particularly, the connecting element may comprise at least one first tie band and/or at least one second tie band. The first tie band may be configured to tie at least a portion of the outer surface of the flexible shield tube so as to mechanically and/or electrically connect the flexible shield tube to the first shielded wire. The second tie band may be configured to tie at least a portion of the outer surface of the flexible shield tube so as to mechanically and/or electrically connect the flexible shield tube to the second shielded wire and to the third shielded wire. Advantageously, the connection process between the flexible shield tube and the shield layers is simplified.

Further particularly, the connecting element may comprise at least one clamp and/or at least one second clamp. The first clamp may be configured to crimp at least a portion of the outer surface of the flexible shield tube and at least a portion of an outer surface of the first outer sheath so as to mechanically and/or electrically connect the flexible shield tube to the first shielded wire. The second clamp may be configured to crimp at least a portion of the outer surface of the flexible shield tube and at least a portion of an outer surface of the second outer sheath and at least a portion an outer surface of the third outer sheath so as to mechanically and/or electrically connect the flexible shield tube to the second shielded wire and to the third shielded wire. Advantageously, the connection process between the flexible shield tube and the shield layers is simplified.

Further particularly, the flexible shield tube, the first outer sheath, the second outer sheath and the third outer sheath may have substantially an equal thickness, preferably wherein the thickness of the flexible shield tube may be lower than the thickness of the first outer sheath, the second outer sheath and the third outer sheath. Advantageously, this arrangement prevents, or at least reduce, any difference in height at the connection portion between the shielded cables and the flexible shield tube, thus enhancing the waterproofing of the splice cable.

Further particularly, the first portion of the flexible shield tube may comprise a first opening and wherein the second portion of the flexible shield tube may comprise a second opening, wherein a surface extension of the first opening is lower than a surface extension of the second opening.

Further particularly, the spliced cable may further comprise a waterproofing element, wherein the waterproofing element may be configured to substantially encase the flexible shield tube. Preferably, the waterproofing element may be molded at least onto the flexible shield tube.

According to another aspect, there is provided an electric circuit comprising the spliced cable according to the above. Furthermore, a vehicle comprising the electric circuit including the spliced cable according to the above is also provided.

A further aspect of the disclosure is directed to a method for splicing a cable, in particular a high-voltage cable, the method comprising the steps of:

providing a first shielded wire, wherein the first shielded wire comprises at least a first conductor and a first shield layer having an outer surface coated with a first outer sheath;

providing a second shielded wire, wherein the second shielded wire comprises a second conductor and a second shield layer having an outer surface coated with a second outer sheath;

providing a third shielded wire, wherein the third shielded wire comprises a third conductor and a third shield layer having an outer surface coated with a third outer sheath;

electrically connecting the first conductor to the second conductor and to the third conductor;

arranging a flexible shield tube having a first portion and a second portion longitudinally adjacent or spaced from the first portion such that the first portion of the flexible shield tube substantially encases an exposed portion of the first shielded wire and such that the second portion of the flexible shield tube substantially encases both an exposed portion of the second shielded wire and an exposed portion of the third shielded wire; and electrically connecting the first portion of the flexible shield tube to the first shield layer and the second portion of the flexible shield tube to both the second shield layer and the third shield layer.

According to a particular embodiment, the method further comprising:

providing at least one connecting element to mechanically and/or electrically connect the flexible shield tube to the first shielded wire, and/or providing at least one connecting element to mechanically and/or electrically connect the flexible shield tube to both the second shielded wire and to the third shielded wire.

According to the above, there is provided a spliced cable, particularly a high-voltage spliced cable that requires a reduced number of components for splicing the shielded cables.

Specifically, there is provided a technique for splicing (particularly high voltage) shielded cables wherein the number of assembly steps is accordingly reduced. Accordingly, the splicing process of high voltage shielded cables is simplified.

Furthermore, there is provided a versatile (particularly high-voltage) spliced cable technique that may be used for splicing (particularly high voltage) shielded cables and that is not affected by the arrangement of the shielded cables.

Moreover, the described spliced cable allows for a lightweight and cost effective splicing. Accordingly, the spliced cable also allows for an efficient extension of a capability of a high-voltage network e.g. in a hybrid or electric vehicle.

These and other objects, features and advantages of the present disclosure will become more apparent upon a reading of the following detailed description and accompanying drawings. It should be understood that even though embodiments are separately described, single features thereof may be combined to additional embodiments.

DETAILED DESCRIPTION OF EMBODIMENTS

With reference to the above figures, a spliced cable 1 of one embodiment of the present disclosure, in particular a high voltage spliced cable, is herein described. Specifically, the spliced cable 1 may be used in connection with a Y-Power distribution (or splitter) unit, particularly having one input and two (or more) output lines. In the present description, with the term "high-voltage" particularly is intended a voltage value substantially above about 40 Volts (e.g. about 48 V) and/or up to about 900V DC. Moreover, a typical spliced cable acting as a splitter unit can distribute power to several HV components e.g. from about 5 A to about 300 A.

Therefore, the spliced cable 1 according to an embodiment is a spliced cable suitable to be used in an electric circuit wherein the voltage value is substantially above about 40 Volts.

Figure 1:
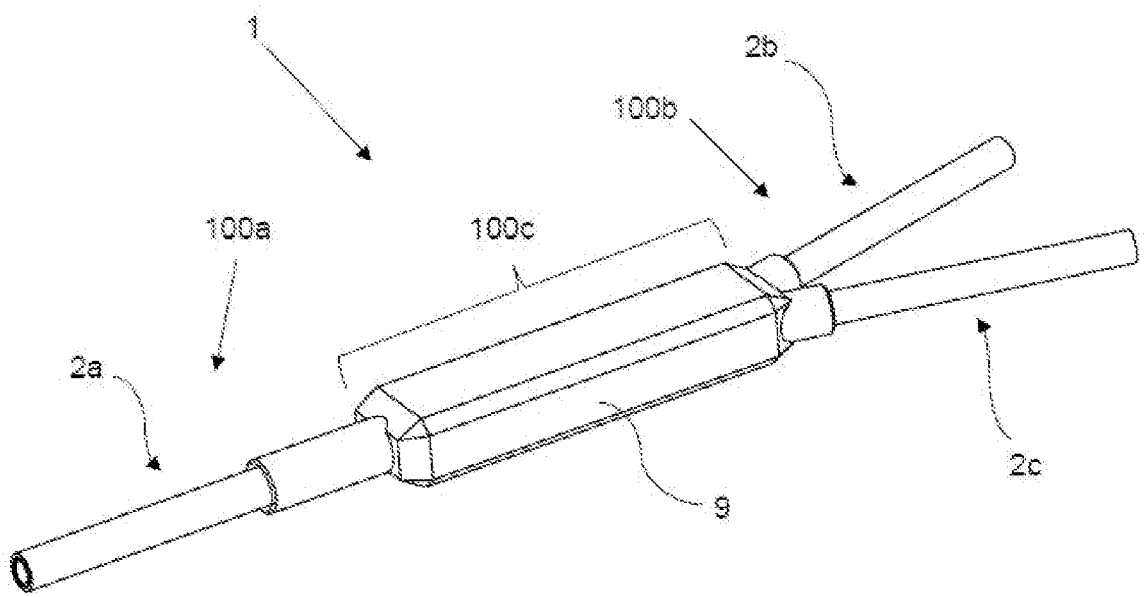
FIG. 1 is an anterior axonometric view of the spliced cable according to one embodiment of the present disclosure.
Figure 2:
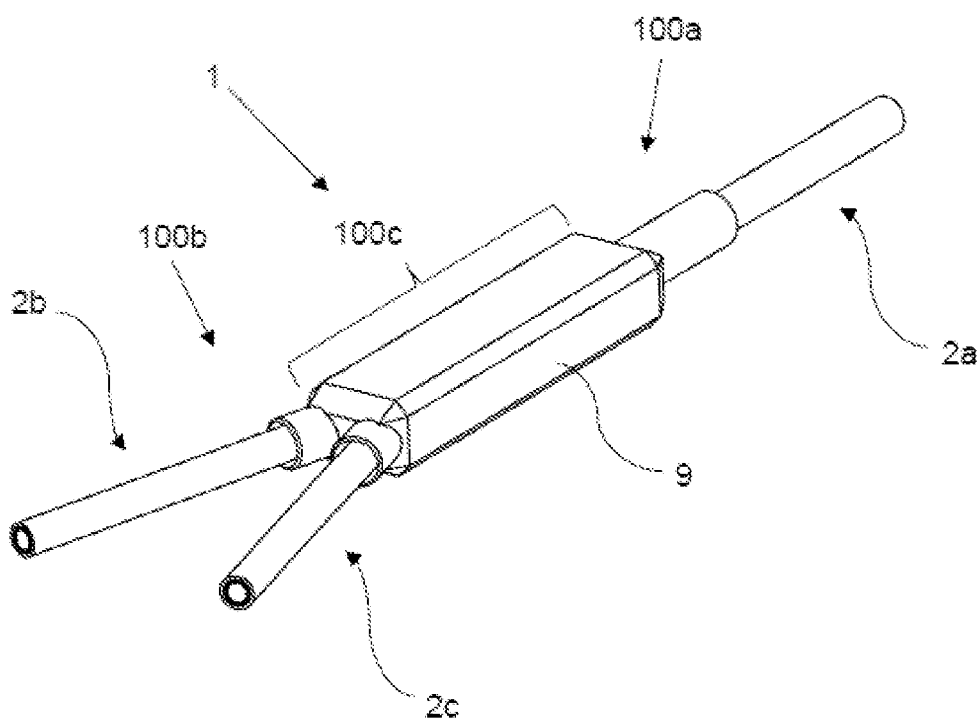
FIG. 2 is a posterior axonometric view of the spliced cable according to one embodiment of the present disclosure.
Figure 3:
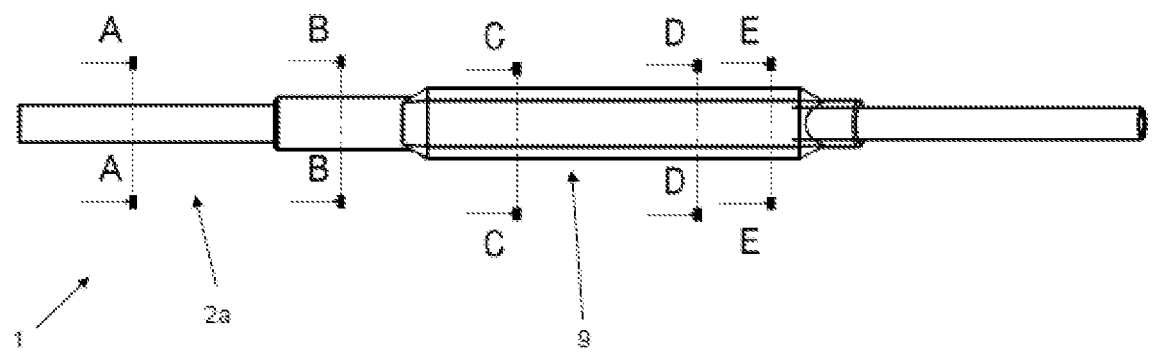
FIG. 3 is a lateral view of the spliced cable of one embodiment of the present disclosure.
Figure 4:
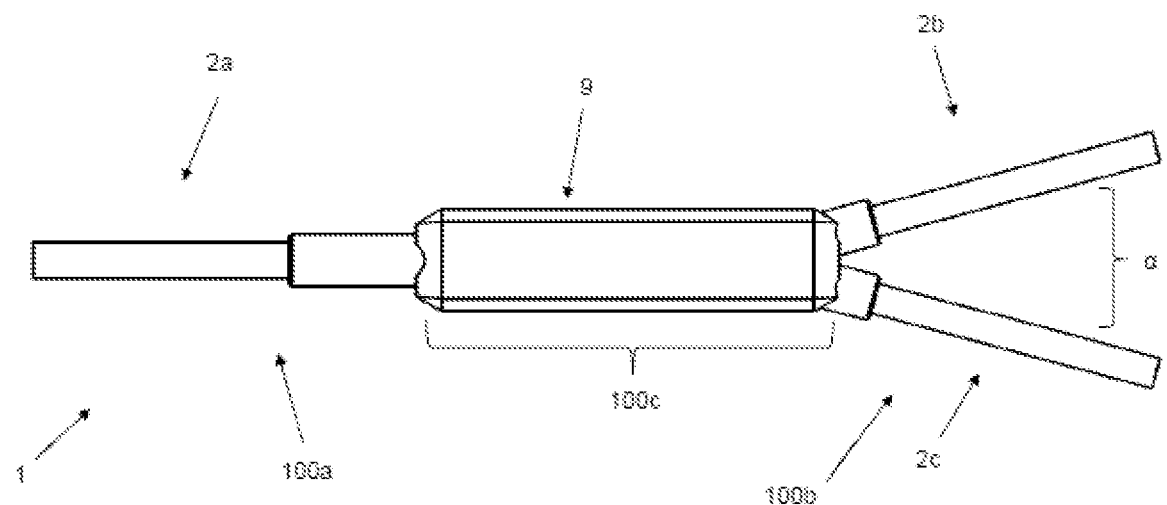
FIG. 4 is a plan view of the spliced cable of one embodiment of the present disclosure.

With reference to FIGS. 1 to 4, the spliced cable 1 is illustrated in an assembled state. The spliced cable 1 comprises a first shielded wire 2a, a second shielded wire 2b and a third shielded wire 2c. As shown in FIGS. 1 and 2, the first shielded wire 2a is arranged on a first side 100a of the spliced cable 1 whereas the second shielded wire 2b and the third shielded wire 2c are substantially arranged on a second side 100b of the spliced cable 1. The first side 100a of the spliced cable 1 is substantially opposite to the second side 100b of the spliced cable 1. Particularly, the second shielded wire 2b and the third shielded wire 2c may be arranged substantially adjacently and/or substantially parallel to each other. Preferably, the second shielded wire 2b and the third shielded wire 2c may be substantially parallel to each other for a specified (predetermined or predeterminable) distance, e.g. substantially in an area where the shielded wires are connected to each other.

Figure 10:
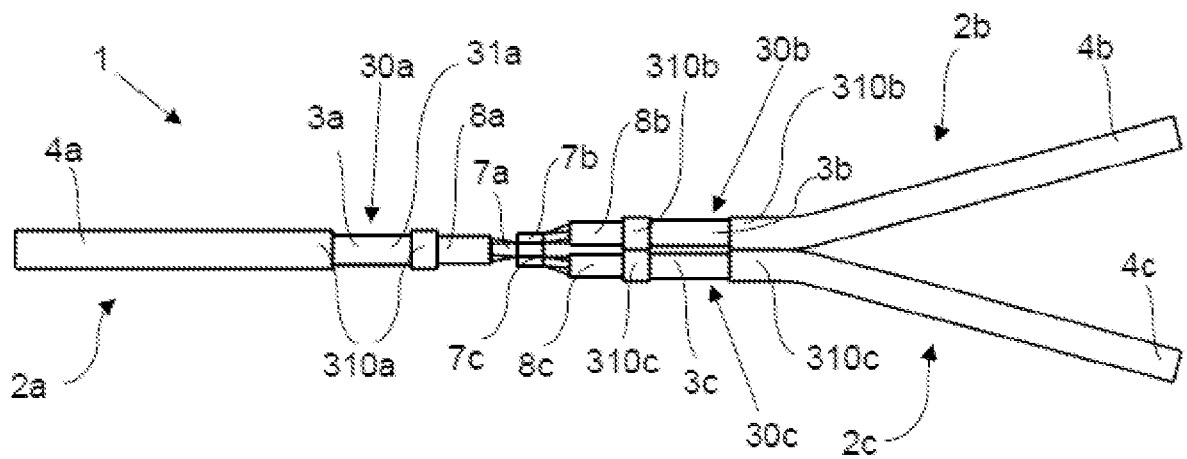
FIG. 10 is a plan view illustrating the method of splicing a cable according to one embodiment of the present disclosure.

As shown in FIGS. 1 and 2, the second shielded wire 2b and the third shielded wire 2c may be arranged such that they substantially diverge from each other. In other words, the second shielded wire 2b and the third shielded wire 2c may be arranged to form an angle "a" therebetween. The angle "a" may be preferably lower than 180°, more preferably lower than 90°, further preferably lower than about 45°. With reference to FIG. 10, the first shielded wire 2a is electrically connected to the second shielded wire 2b and to the third shielded wire 2c. The shielded wires 2a, 2b, and 2c are electrically connected at an intermediate (particularly central) portion 100c of the spliced cable 1. The electrical connection between the shielded wires 2a, 2b, 2c will be described in detail in the following passages.

Figure 5:
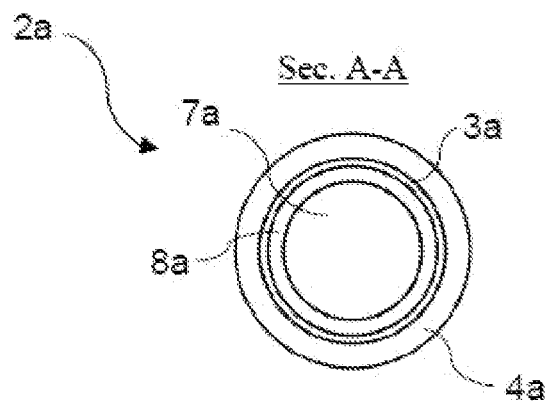
FIG. 5 is a cross-sectional view along A-A of FIG. 3.

Turning to FIG. 5, a structure of the first shielded wire 2a is herein described. While a detailed description of the structure of the shielded wires according to an embodiment of the present disclosure is only provided for the first shielded wire 2a, the second shielded wire 2b as well as the third shielded wire 2c have similar or substantially the same structure below described with respect to the first shielded wire 2a. In other words, the first shielded wire 2a, the second shielded wire 2b and the third shielded wire 2c have substantially the same structure. As shown in FIG. 5, the first shielded wire 2a comprises at least one conductor 7a, at least one insulating layer 8a, at least one first shield layer 3a and at least one first outer sheath 4a in this order. Particularly, the first shielded wire 2a may comprise a single conductor 7a. Alternatively, the first shielded wire 2a particularly may comprise a plurality of conductors 7a being twisted or arranged substantially parallelly to each other.

The conductor 7a may comprise a solid wire and/or a stranded wire which may be made of any suitable material for conducting electric energy, e.g. Copper, Copper alloy, Aluminum, Aluminum alloy or other metallic materials suitable for conducting electric energy. Particularly, the conductor 7a may be formed as a rounded wire, i.e. having a substantially circular cross-section. Alternatively, the conductor 7a may have a substantially polygonal-shaped cross-section, e.g. substantially square, rectangular, hexagonal. The second shielded wire 2b and the third shielded wire 2c each comprises at least one conductor 7b and at least one conductor 7c, respectively, particularly having similar or substantially the same structure and/or particularly being substantially made of the same materials described for the conductor 7a of the first shielded wire 2a. The at least one conductor 7a, 7b, 7c may have a cross-sectional size particularly ranging from about 2.5 mm$^2$ to about 120 mm$^2$.

With reference to FIG. 5, the first shielded wire 2a comprises a first insulating layer 8a made of an electrically insulating material. The first insulating layer 8a is arranged to integrally or unitarily cover an outer surface of the at least one conductor 7a such that the conductor 7a can be electrically isolated. The first insulating layer 8a may be formed with any material suitable to electrically isolate the conductor 7a. For example, the insulating layer 8a may be formed from a thermoplastic polymeric material. Particularly, the insulating layer 8a may be formed from or comprise a polyvinyl chloride resin (PVC), polyethylene (PE) resin or polypropylene (PP) resin, Silicone Rubber (SiR) or the like. The second shielded wire 2b and the third shielded wire 2c each comprises a second insulating layer 8b and a third insulating layer 8c, respectively. The insulating layers 8b and 8c substantially have a similar or same structure and/or particularly are substantially made of the same materials described with respect to the insulating layer 8a of the first shielded wire 2a.

Still referring to FIG. 5, the first shielded wire 2a comprises a first shield layer 3a. The first shield layer 3a is arranged to integrally or unitarily cover an outer surface of the insulating layer 8a. Particularly, the first shield layer 3a may comprise a tubular-shaped braided element. Further particularly, the tubular-shaped braided element may be formed by braiding or knitting a plurality of wires that are formed of a conductive material. For example, the wires forming the tubular-shaped braided element may be formed of any suitable metallic material. Particularly, the shield layer 3a may be made of a metallic material suitable to suppress electromagnetic noise that may affects the wires 2a, 2b and 2c. Preferably, the shield layer 3a may be made of Copper, Copper alloy, Aluminum or Aluminum alloy. The surface of the wires of the shield layer 3a may be plated e.g. with Nickel or Silver or Gold. Alternatively, or additionally, the first shield layer 3a may comprise a foil shielding particularly including a conductive (e.g. metallic) foil or a conductive (e.g. metallic) tape. Particularly, the shield layer 3a may comprise both a braided shield layer and a composite foil shielding comprising a conductive component and a non-conductive component (such as an ALU-PET foil) wherein the conductive component of the composite foil may be in electric contact to the braided shield layer.

In other words, the shield layer 3a is a layer configured to shield the conductor 7a from electromagnetic noise. Alternatively or additionally, the first shield layer 3a may comprise a metallic foil arranged to form a spirally shaped arrangement over the outer surface of the insulating layer 8a. Despite not described, each of the second shielded wire 2b and the third shielded wire 2c comprises a second shield layer 3b and a third layer 3c, respectively. The shield layers 3b and 3c have substantially the same structure, configuration, suitability and/or are substantially made of the same materials described with respect to the first shield layer 3a of the first shielded wire 2a.

Still referring to FIG. 5, the first shielded wire 2a comprises a first outer sheath 4a. The first outer sheath 4a is arranged to integrally or unitarily cover the outer surface 30a of the shield layer 3a. That is, the outer surface 30a of the first shield layer 3a is integrally or unitarily coated with the first outer sheath 4a. As shown in FIG. 5, the outer sheath 4a is substantially the outermost layer of the first shielded wire 2a. Preferably, the outer sheath 4a may comprises an electrically insulating material. More preferably, the outer sheath 4a may be formed of a material configured to electrically isolate the first shielded wire 2a and particularly also provide water-proofing. Particularly, the first outer sheath 4a may be formed from or comprise a thermoplastic polymeric material, e.g. polyvinyl chloride (PVC) resin, polyethylene (PE) resin or polypropylene (PP) resin, Silicone Rubber (SiR) or the like. Despite not specifically described, each of the second shielded wire 2b and the third shielded wire 2c comprises a second outer sheath 4b and a third outer sheath 4c, respectively. The second outer sheath 4b and the third outer sheath 4c have substantially the same structure, configuration, suitability and/or may be made of the same materials described with respect to the first outer sheath 4a of the first shielded wire 2a.

In summary, the structure, arrangements and materials above described with respect to the first shielded wire 2a, may substantially correspond to the structures, arrangements and materials of the second shielded wire 2b and/or of the third shielded wire 2c. In other words, the second shielded wire 2b and the third shielded wire 2c particularly comprise the same structures, arrangements, shapes and materials, above described with respect to the conductor 7a, the insulating layer 8a, the shield layer 3a and/or the outer sheath 4a of the first shielded wire 2a. For the sake of completeness, as shown in FIGS. 8 to 14, the second shielded wire 2b comprises a second conductor 7b, a second insulating layer 8b and a second shield layer 3b having an outer surface 30b coated with a second outer sheath 4b. The third shielded wire 2c comprises a third conductor 7c, a third insulating layer 8c and a third shield layer 3c having an outer surface 30c coated with a third outer sheath 4c.

Figure 7:
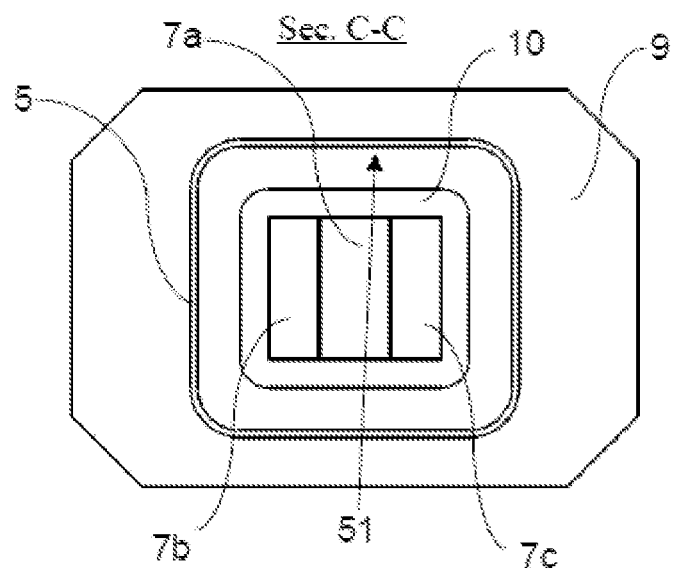
FIG. 7 is a cross-sectional view along C-C of FIG. 3.

Referring to FIGS. 7 and 10, in the spliced cable 1 according to an embodiment of the present disclosure, the first conductor 7a of the first shielded wire 2a is electrically connected to the second conductor 7b of the second shielded wire 2b and to the third conductor 7c of the third conductor 7c. Preferably, the first conductor 7a may be welded to the second conductor 7b and to the third conductor 7c as shown in detail in FIG. 7. More preferably, the first conductor 7a may be ultrasonic welded, ultrasonically welded, resistance welded, magnetic pulse welded, soldered, brazed and/or crimped to the second conductor 7b and/or to the third conductor 7c. Particularly, end portions of each of the first conductor 7a, second conductor 7b and/or third conductor 7c may be arranged substantially parallelly to each other and, thus, electrically connected to each other. Particularly, the first conductor 7a may be interposed between, and electrically connected, to the second conductor 7b and to the third conductor 7c as shown in FIG. 7.

Figure 11:
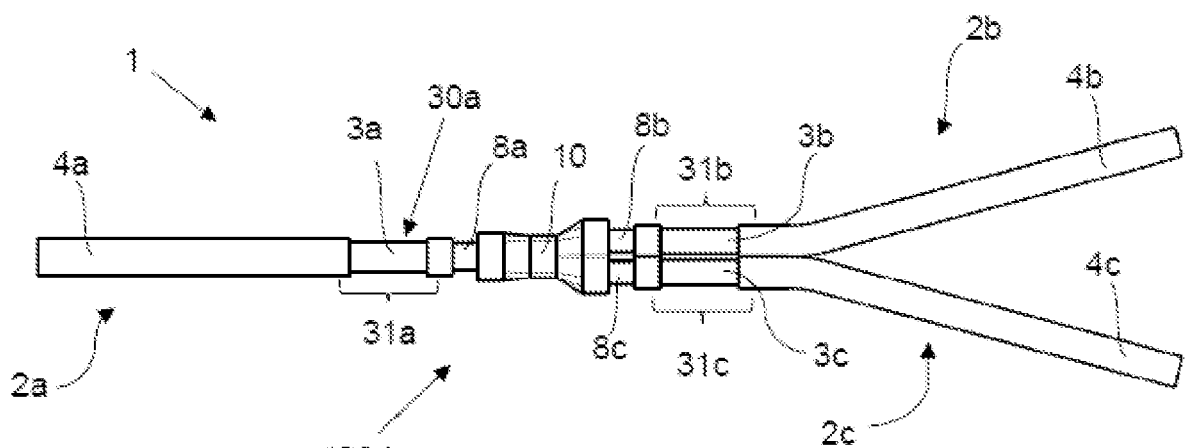
FIG. 11 is a plan view illustrating the method of splicing a cable according to one embodiment of the present disclosure.

Turning to FIGS. 7 and 11, the spliced cable 1 may comprise an isolating layer 10 provided at the intermediate (particularly central) portion 100c of the spliced cable 1, particularly at the portion where the conductors 7a, 7b and 7c are electrically connected to each other. Particularly, the insulation layer 10 may be or comprise a shrinkable tube-shaped element and/or an insulation tape (such as a silicone tape) arranged to substantially cover the first conductor 7a, the second conductor 7b and the third conductor 7c at the intermediate (particularly central) portion 100c of the spliced cable 1, particularly at the portion where the conductors 7a, 7b and 7c are electrically connected to each other. The isolating layer 10 may be a layer configured to electrically isolate the conductors 7a, 7b and 7c. For example, the isolating layer 10 may comprise a material suitable to electrically isolate the conductors 7a, 7b and 7c. Additionally, the isolating layer 10 may be comprise a shrinkable tube element made of or comprising a material that is capable of shrink when heated above a give temperature such that, when heated, the shrinkable tube element by shrinking substantially takes the form of the underneath electrically-connected conductors 7a, 7b and 7c. Particularly, the isolating layer 10 may be a thermoplastic polymeric material. Specifically, the isolating layer 10 may be made of or comprise any one of a range of thermoplastics, including polyolefin, polyvinyl chloride (PVC), Viton® (particularly for high-temperature and/or corrosive environments), Neoprene®, polytetrafluoroethylene (PTFE), fluorinated ethylene propylene (FEP) and/or Kynar®. Further specifically, in addition to these polymers, the isolating layer 10 may include an adhesive lining that promotes bonding of the isolating layer 10 to the underlying structure such as the electrically connected conductors 7a, 7b and 7c and/or any taping (e.g. silicone tape or the like) provided thereon.

As shown in FIG. 11, the isolating layer 10 may be configured to overlap at least an exposed portion of each of the insulating layers 8a, 8b and 8c of each of the first, second and third shielded wires 2a, 2b, 2c, respectively. According to this arrangement, the isolating layer 10 particularly allows to seamlessly connect the insulating layer 8a of the first shielded wire 2a to the insulating layers 8b and 8c of the second shielded wire 2b and of the third shielded wire 2c, respectively.

Turning to FIGS. 6 to 8 and 12, the spliced cable 1 further comprises a flexible shield tube 5. The shield tube 5 is formed as a flexible element, i.e. the shape of the shield tube 5 can be substantially adapted to the shape of the portions that are encased by the shield tube 5. Therefore, if the flexible shield tube 5 encases a substantially straight element, the flexible shield tube 5 may generally take a substantially linear shape substantially corresponding to the shape of the encased element, whereas if the flexible shield tube 5 encases a substantially arc-shaped element, the flexible shield tube 5 may generally take a corresponding substantially arc-shaped shape. The flexible shield tube 5 may be a substantially tube-shaped element configured to integrally or unitarily encase a spliced cable sub-assembly 100d comprising the electrically connected conductors 7a, 7b, 7c, at least portions of the insulating layers 8a, 8b, 8c, the isolating layer 10 that encases or surrounds the electrically connected conductors 7a, 7b, 7c, and at least a portion of each of the first shield layer 3a, the second shield layer 3b and the third shield layer 3c.

Figure 12:
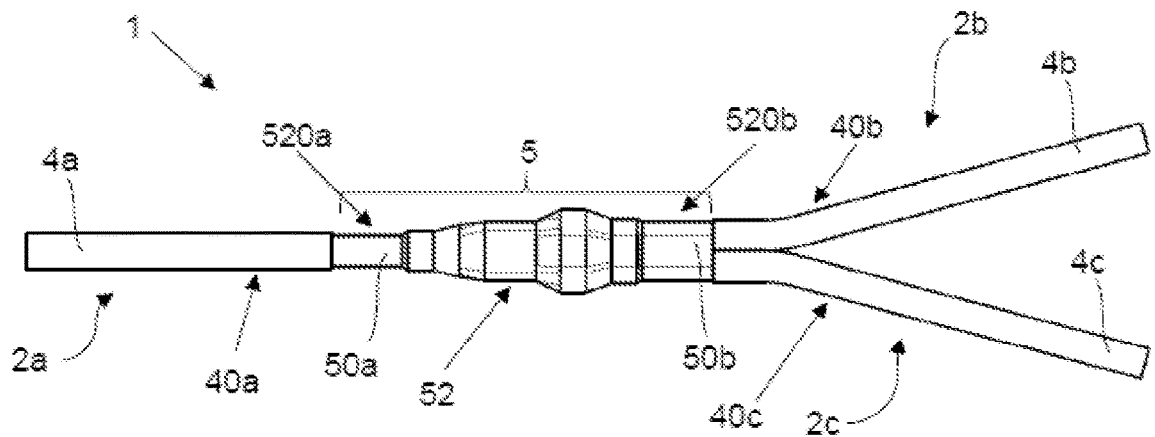
FIG. 12 is a plan view illustrating the method of splicing a cable according to one embodiment of the present disclosure.

The flexible shield tube 5 comprises a first portion 50a and a second portion 50b longitudinally adjacent or spaced from each other. Specifically, the first portion 50a of the flexible shield tube 5 may be a first end portion of the flexible shield tube 5 and the second portion 50b of the flexible shield tube 5 may be a second end portion of the flexible shield tube 5 that is substantially longitudinally opposite to the first end portion of the flexible shield tube 5. The first portion 50a of the flexible shield tube 5 is disposed to substantially encase or surround an exposed portion 31a of the first shielded wire 2a while the second portion 50b of the flexible shield tube 5 is disposed to substantially encase or surround both an exposed portion 31b of the second shielded wire 2b and an exposed portion 31c of the third shielded wire 2c, as shown in FIG. 12. Particularly, the exposed portions 31a, 31b, 31c of each of the first shielded wire 2a, second shielded wire 2b and/or third shielded wire 2c, respectively, may be an exposed end portion of each of the first shielded wire 2a, of the second shielded wire 2b and/or of the third shielded wire 2c, respectively.

Further particularly, the exposed portions 31a, 31b and 31c of each of the first shielded wire 2a, the second shielded wire 2b and the third shielded wire 2c may be exposed portions, or exposed end portions, of the first, second and third shield layers 3a, 3b, 3c, respectively, wherein a portion of the first, second and third outer sheath 4a, 4b, 4c, is stripped off so as to expose the outer surface 30a, 30b, 30c of each first, second and third shield layer 3a, 3b, 3c.

Still referring to FIGS. 6 to 8 and 12, the first portion 50a of the flexible shield tube 5 is to be electrically connected to the first shield layer 3a, and the second portion 50b of the flexible shield tube 5 is to be electrically connected to both the second shield layer 3b and the third shield layer 3c.

Figure 8:
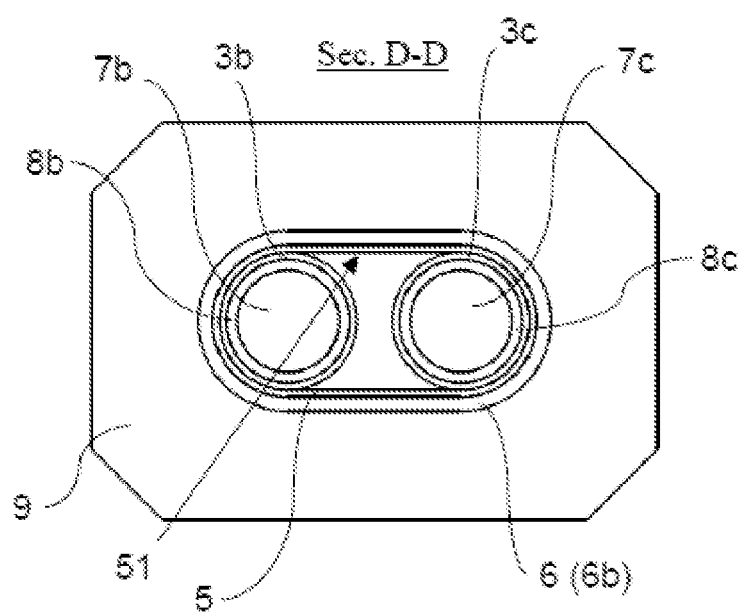
FIG. 8 is a cross-sectional view along D-D of FIG. 3.
Figure 9:
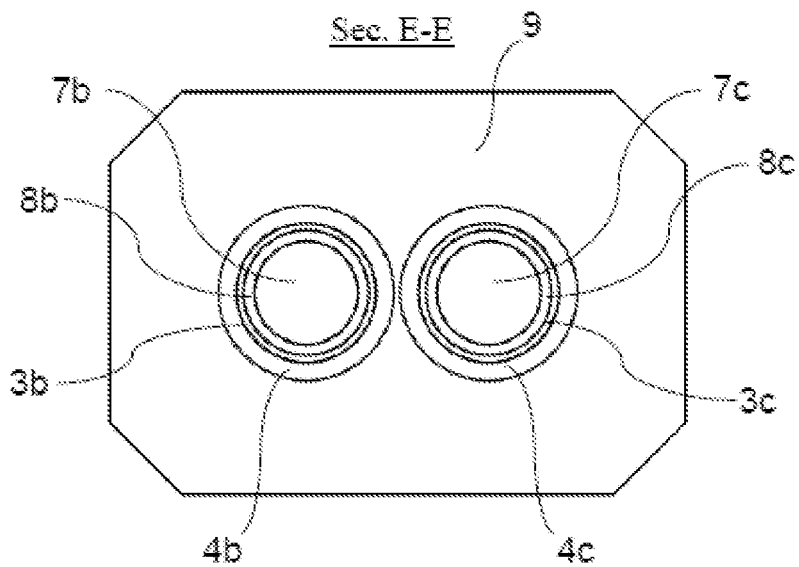
FIG. 9 is a cross-sectional view along E-E of FIG. 3.

As shown in FIGS. 7 and 8, the first portion 50a of the flexible shield tube 5 defines a substantially circular-shaped first opening wherein the first shielded wire 2a is arranged. Accordingly, an inner surface 51 of the flexible shield tube 5 may be arranged to substantially abut the outer surface 30a of the first shield layer 3a such that an electrical connection is obtained between the flexible shield tube 5 and the first shield layer 3a of the first shielded cable 2a. Similarly, the second portion 50b of the flexible shield tube 5 defines a substantially circular-shaped second opening wherein the second shielded wire 2b and the third shielded wire 2c are arranged. Particularly, the inner surface 51 of the flexible shield tube 5 may be arranged to substantially abut both the outer surface 30b of the second shield layer 3b and the outer surface 30c of the third shield layer 3c such that an electrical connection is or can be obtained between the flexible shield tube 5 and the second shield layer 3b of the second shielded wire 2b, and the flexible shield tube 5 and the third shield layer 3c of the third shielded wire 2c.

Figure 6:
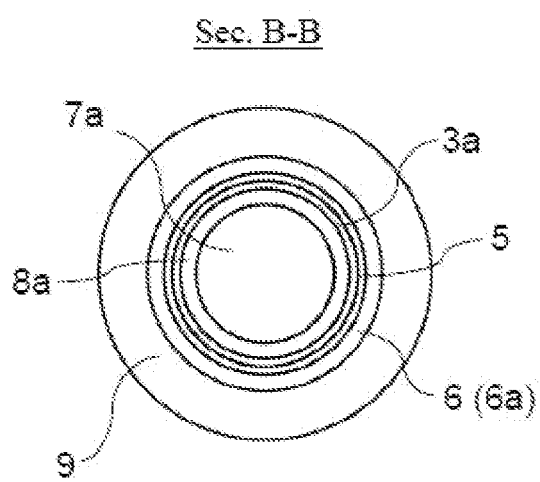
FIG. 6 is a cross-sectional view along B-B of FIG. 3.

Particularly, as shown in FIGS. 6 and 8, the surface extension of the first opening at the first portion 50a (Section B-B), that is the area of the first opening, may be lower than a surface extension of the second opening at the second portion 50b of the flexible shield tube 5 (Section D-D), wherein the second opening is configured to encase both the second shielded wire 2b and the third shielded wire 2c. In other words, the flexible shield tube 5 may be shaped as a tapered tube, that particularly substantially has a tapered conical shape.

Particularly, the flexible shield tube 5 may be a braided tube. Preferably, the braided tube 5 may be formed by braiding or knitting a plurality of wires that are formed of a conductive material. For example, the wires forming the flexible shield tube 5 may be formed of any suitable metallic material configured to suppress electromagnetic noise influences. The flexible shield tube 5 may be made of Copper, Copper alloy, Aluminum or Aluminum alloy, composed metal and resin, such as Copper and polyester (either mono- or multifilament braid), Aluminum and polyester (either mono- or multifilament braid). The surface of the wires of the shield tube 5 may be plated e.g. with Nickel or Silver or Gold.

Accordingly, the spliced cable 1 wherein the shielded wires 2a, 2b and 2c are electrically connected, can be also shielded from electromagnetic noise influences as each shielded wire. Alternatively or additionally, the flexible shield tube 5 may comprise a metallic foil (such as a Copper/PET foil or Aluminum/PET foil) or layer arranged to encase a spliced cable sub-assembly 100d that comprises the electrically connected conductors 7a, 7b, 7c, the isolating layer 10 that encases the electrically connected conductors 7a, 7b, 7c, and at least portions of the first shield layer 3a, the second shield layer 3b and the third shield layer 3c.

Further particularly, the flexible shield tube 5 may comprise an elastically deformable material so as to provide the flexible shield tube 5 with elastic or resilient properties that allow the flexible shield tube 5 to elastically encase the sub-assembly 100d. In other words, the flexible shield tube 5 may be configured to elastically or resiliently adhere to the sub-assembly 100d so as to substantially assume the shape of the underneath sub-assembly 100d.

Particularly, as shown in FIGS. 6, 8 and 10, the exposed portion 31a of the first shielded wire 2a may comprise a portion of the first shield layer 3a wherein a portion of the first outer sheath 4a is stripped off such that the outer surface 30a of the first shield layer 3a is exposed. Preferably, the portion of the first shield layer 3a where the first outer sheath 4a is stripped may be interposed between a couple of portions 310a of the first shield layer 3a that are coated with the first outer sheath 4a. Particularly, the inner surface 51 of the flexible shield tube 5 may be disposed to substantially abut the outer surface 30a of the first shield layer 3a at the exposed portion 31a between the couple of portions 310a coated with the outer sheath 4a. More preferably, the exposed portion 31a of the first shielded wire 2a may be an exposed end portion of the first shielded wire 2a.

Particularly, the exposed portion 31b of the second shielded wire layer 2b may comprise a portion of the second shield layer 3b wherein the second outer sheath 4b is stripped off so as the outer surface 30b of the second shield layer 3b is exposed. Preferably, the portion of the second shield layer 3b where the second outer sheath 4b is stripped off may be interposed between a couple of portions 310b of the second shield layer 3b that are instead coated with the second outer sheath 4b. Particularly, the inner surface 51 of the flexible shield tube 5 may be disposed to substantially abut the outer surface 30b of the second shield layer 3b at the exposed portion 31b interposed between the couple of portions 310b coated with the outer sheath 4b. More preferably, the exposed portion 31a of the first shielded wire 2a may be a substantially exposed end portion of the first shielded wire 2a. Particularly, the exposed portion 31c of the third shielded wire 3c may comprise a portion of the third shield layer 3c wherein the third outer sheath 4c is stripped off such that the outer surface 30c of the third shield layer 3c substantially is exposed. The exposed portion of the third shield layer 3c where the third outer sheath 4c is stripped off may be interposed between a couple of portions 310c of the third shield layer 3c that are coated with the third outer sheath 4c. Particularly, the inner surface 51 of the flexible shield tube 5 may be disposed to substantially abut the outer surface 30c of the third shield layer 3c at the exposed portion 31c interposed between the couple of portions 310c of the third shield layer. More preferably, the exposed portion 31c of the third shielded wire 2c substantially may be an exposed end portion of the third shielded wire 2c.

Alternatively, the exposed portion 31a of the first shielded wire 2a may comprise an exposed end portion of the first shield layer 3a that may be interposed between the stripped-off portion of the conductor 7a, wherein the stripped-off of the conductor 7a is electrically connected to the second conductor 7b and to the third conductor 7c, and a portion of the first shield layer 3a that is coated with the first other sheath 4a. In other words, according to this embodiment, the exposed portion of the first shield layer 3a may be interposed between an exposed portion of the conductor 7a and a portion of the first outer sheath 4a. Analogously, the exposed portion 31b of the second shielded wire layer 2b and the exposed portion 3c of the third shielded wire layer 2c may have this alternative arrangement as described with respect to the exposed portion 31a of the first shielded wire 2a.

As shown in FIGS. 6, 8 and 10, the spliced cable 1 may further comprise at least one connecting element 6. The connecting element 6 may be an element configured to mechanically and/or electrically connect the flexible shield tube 5 to the first shielded wire 2a, to the second shielded wire 2b and to the third shielded wire 2c.

Figure 13:
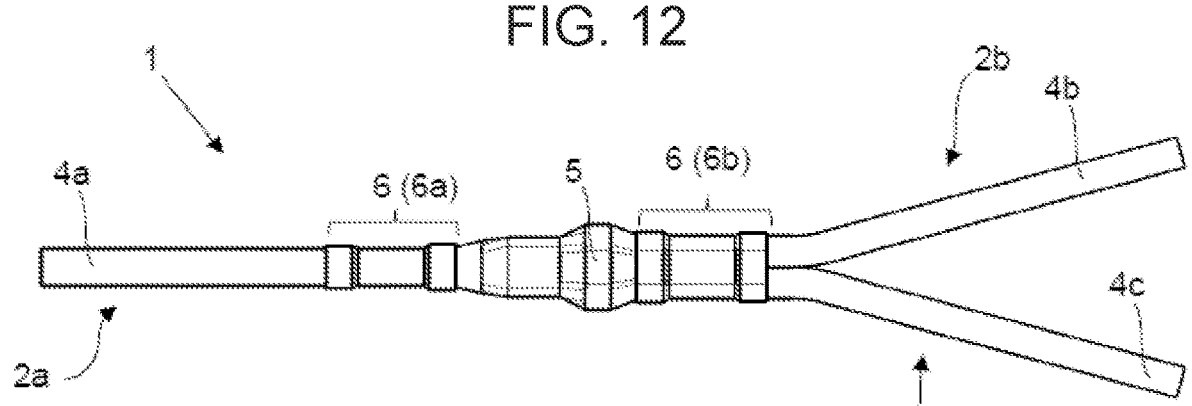
FIG. 13 is a plan view illustrating the method of splicing a cable according to one embodiment of the present disclosure.

As shown in FIGS. 6, 8 and 10, the connecting element 6 may comprise at least one first adhesive tape 6a and/or at least one second adhesive tape 6b. The adhesive tapes 6a, 6b may be electrical insulating tapes that allows to electrically insulate a wire that conducts electricity. As shown in FIG. 13, the first adhesive tape 6a may be substantially configured to encase or surround at least a portion 520a, preferably an end portion, of the outer surface 52 of the flexible shield tube 5 and at least a portion of an outer surface 40a of the first outer sheath 4a so as to mechanically and/or electrically connect the flexible shield tube 5 to the first shielded wire 2a. In other words, the adhesive tape 6a may be wrapped on to the spliced cable 1, e.g. by substantially forming a spirally-shaped arrangement that covers both at least a portion of the outer surface 52 of the flexible shield tube 5 and at least a portion of the outer surface 40a of the first outer sheath 4a. This arrangement allows to seamlessly connect the flexible shield tube 5 to the first shielded wire 2a, particularly to the first shield layer 3a.

The second adhesive tape 6b may be configured to encase or surround at least a portion 520b, preferably an end portion, of the outer surface 52 of the flexible shield tube 5 and at least a portion of an outer surface 40b of the second outer sheath 4b and at least a portion an outer surface 40c of the third outer sheath 4c so as to mechanically and/or electrically connect the flexible shield tube 5 to the second shielded wire 2b and to the third shielded wire 2c. In other words, the second adhesive tape 6b may be wrapped on the spliced cable 1, e.g. by substantially forming a spirally-shaped arrangement that covers both the outer surface 52 of the flexible shield tube 5 and the outer surfaces 40b and 40c of the second and the third outer sheath 4b, 4c, respectively. This arrangement allows to substantially seamlessly mechanically and/or electrically connect the flexible shield tube 5 to the second shielded wire 2b and to the third shielded wire 2c, particularly to the second shield layer 3b and to the third shield layer 3c.

Particularly, the at least one connecting element 6 may comprise at least a first tie band and at least one second tie band (not illustrated in the enclosed drawings). The tie band may be configured to integrally encircle the outer surface 52 of the flexible shield tube 5 and to permanently tie the flexible shield tube 5 over the underneath portion of the shielded wires 2a, 2b, 2c (that is the portions of the shielded wires that are encased by the flexible tube 5, i.e. exposed portions 31a, 31b, 31c of the shielded wires 2a, 2b, 2c), when the tie band is tied on the flexible shield tube 5. The first tie band may be configured to tie at least a portion 520a, preferably an end portion, of the outer surface 52 of the flexible shield tube 5 over the underneath exposed end portion 31a of the first shield layer 3a of the first shielded wire 2a. According to this configuration, the flexible shield tube 5 can be seamlessly (electrically and/or mechanically) connected to the first shielded wire 2a, particularly to the first shield layer 3a.

The second tie band may be configured to tie at least the portion 520b, preferably an end portion, of the outer surface 52 of the flexible shield tube 5 that is longitudinally opposite to the other portion 520a of the outer surface 52 of the flexible shield tube 5. Particularly, the second tie band may be configured to tie at least the portion 520b of the outer surface 52 of the flexible shield tube 5 over the underneath exposed portions 31b and 31c of the second shielded wires 2b and the third shielded wire 2c. According to this configuration, the flexible shield tube 5 can be thus seamlessly connected (electrically and/or mechanically) to the second shielded wire 2b and to the third shielded wire 2c.

Particularly, despite not being illustrated in the enclosed drawings, the connecting element 6 may comprise a first clamp or crimped connector and/or a second clamp or crimped connector. The first clamp or crimped connector may be configured to encase, or surround, and crimp together (by being deformed) at least a portion 520a, preferably an end portion, of the outer surface 52 of the flexible shield tube 5 and at least a portion of an outer surface 40a of the first outer sheath 4a so as to mechanically and/or electrically connect the flexible shield tube 5 to the first shielded wire 2a. The second clamp or crimped connector may be configured to encase, or surround, and crimp together (by being deformed) at least a portion 520b, preferably an end portion, of the outer surface 52 of the flexible shield tube 5 and at least a portion of an outer surface 40b of the second outer sheath 4b and at least a portion an outer surface 40c of the third outer sheath 4c so as to mechanically and/or electrically connect the flexible shield tube 5 to the second shielded wire 2b and to the third shielded wire 2c.

Particularly, the flexible shield tube 5, the first outer sheath 4a, the second outer sheath 4b and the third outer sheath 4c may have substantially an equal thickness. Preferably, the thickness of the flexible shield tube 5 may be lower than the thickness of the first outer sheath 4a, the second outer sheath 4b and the third outer sheath 4. Advantageously, by configuring the flexible shield tube 5 to have a lower thickness than the thickness of the first, second and third outer sheath 4a, 4b, 4c, avoids any difference in height at the portion where the adhesive tape is wrapped.

As shown particularly in FIGS. 7 to 9 and 14, the spliced cable 1 may further comprise a waterproofing element or case 9. The waterproofing element 9 may be configured to substantially encase the flexible shield tube 5 at the central portion 100c of the spliced cable 1 so as to provide waterproof properties to the spliced cable 1. The waterproofing element 9 may be a waterproof molding, for example. The waterproofing element 9 may be made of a thermoplastic polymer or a thermosetting polymer. Preferably, the waterproofing element 9 may be made of polyvinyl chloride resin, polyethylene resin or polypropylene resin or polyurethane resin (PUR).

Particularly, the waterproofing element 9 may comprise two complementary connectable shells configured to encase the central portion 100c of the spliced cable 1 where the conductors 7a, 7b, 7c are electrically connected, the flexible shield tube 5, and the connecting element 6, e.g. the adhesive tapes 6a, 6b.

The spliced cable 1, may be part of an electric circuit, in particular a high-voltage circuit. In other words, the spliced cable 1 may be a branch in an electric circuit, particularly a high-voltage electric circuit. The electric circuit may be an electric circuit of a vehicle, for example a hybrid vehicle or an electric vehicle. Exemplary applications include electric circuits for providing electric power to electric motors, charging units, power storage units, high-voltage (HV) units, air conditioning compressors and/or Positive Temperature Coefficient (PTC) auxiliary heaters and/or in-vehicle connection from a charging socket to a charging unit. The spliced cable 1 may also be used for sensor cables, control cables and/or power cables within automotive vehicles, e.g. within the engine compartment. Alternatively or additionally, the spliced cable 1 may be used in connection with general power lines and in the area of telecommunication. Particularly, the spliced cable 1 specifically may be used as a splitter unit, particularly a Y-Power distribution (or splitter) unit which specifically has one input and two (or more) output lines.

Turning now to FIGS. 10 to 14, a method for splicing a cable according to an embodiment of the present disclosure is herein described.

Accordingly, a first shielded cable 2a is spliced into a second shielded cable 3a and to a third shielded cable 4a.

As shown in FIG. 10, according to a particular first step, the first shielded wire 2a, the second shielded wire 2b and the third shielded wire 2c are provided. The first shielded wire 2a comprises a first conductor 7a, and a first shield layer 3a having an outer surface 30a coated with a first outer sheath 4a. The second shielded wire 2b comprises a second conductor 7b and a second shield layer 3b having an outer surface 30b that is coated with a second outer sheath 4b. The third shielded wire 2c comprises a third conductor 7c, and a third shield layer 3c having an outer surface 30c that is coated with a third outer sheath 4c.

As shown in FIG. 10, according to a particular second step, the first conductor 7a is electrically connected at least to the second conductor 7b and/or to the third conductor 7b. In order to electrically connect the conductors 7a, 7b and 7c, the outer sheaths 4a, 4b, 4c, the shield layers 3a, 3b, 3c and the insulating layers 8a, 8b, 8c of each shielded wire 2a, 2b, 2c are stripped off so as to at least partly expose (particularly an end portion of) each conductor 7a, 7b and 7c. The first conductor 7a is then electrically connected to the second conductor 7b and to the third conductor 7c. For example, the conductors 7a, 7b and 7c may be electrically connected by solid-state welding, preferably by ultrasonic welding. Alternatively, the conductors may be soldered together. Further alternatively, the conductors 7a, 7b and 7c may be configured to substantially contact to each other so as to create an electrical connection therebetween. Preferably, the conductors 7a, 7b and 7c may be mechanically connected to each other (e.g. by clamping or the like) so as to maintain the electrical connection therebetween.

Particularly, the first conductor 7a may be interposed between the second conductor 7b and the third conductor 7c and electrically connected to both the second conductor 7b on a first lateral side, and to the third conductor 7c on a second lateral side.

As shown in FIG. 11, in a particular third (optional) step of the splicing method, a isolating layer 10 may be provided. The isolating layer 10 may be a tube-shaped element suitable to encase and cover the first conductor 7a, the second conductor 7b and the third conductor 7c, particularly at the central portion 100c of the spliced cable 1 where the conductors 7a, 7b, 7c are electrically connected. The isolating layer 10 may be a layer configured to electrically isolate the conductors 7a, 7b and 7c as above described. Particularly, the isolating layer 10 may comprise a material suitable to electrically isolate the conductors 7a, 7b and 7c.

Additionally, the isolating layer 10 may comprise a material (e.g. in the form of a tube element) that is capable of shrink when heated above a given temperature that depends on the material of the isolating layer itself. Therefore, when heated above a given temperature, the isolating layer 10 shrinks over the conductors and takes the form of the underneath conductors 7a, 7b and 7c that are electrically connected.

As shown in FIG. 11, the isolating layer 10 may be firstly introduced over the spliced cable 1, particularly so as to cover the central portion 100c of the spliced cable 1 where the conductors 7a, 7b, 7c are electrically connected. Afterwards, the isolating layer 10 may be then heated by a heating element (not illustrated in FIG. 11) so as to shrink over and embed the conductors 7a, 7b and 7c. Alternatively, the isolating layer 10 may be wrapped or taped over the spliced cable 1, particularly over the conductors 7a, 7b and 7c that are electrically connected.

Turning now to FIG. 12, according to a particular fourth step of the method, the flexible shield tube 5 is provided. The flexible shield tube 5 comprises a first portion 50a and a second portion 50b longitudinally opposite to the first end portion 50a, wherein the first portion 50a of the flexible shield tube 5 is configured to substantially encase an exposed portion 31a of the first shielded wire 2a and wherein the second portion 50b of the flexible shield tube 5 is configured to substantially encase both an exposed portion 31b of the second shielded wire 2b and an exposed portion 31c of the third shielded wire 2c. As shown in FIG. 12, the flexible shield tube 5 may be introduced over the spliced cable 1 so as to substantially encase the exposed portion 31a of the first shielded wire 2a, the exposed portion 31b of the second shielded wire 2b and the exposed portion 31c of the third shielded wire 2c.

Subsequently, the first portion 50a of the flexible shield tube 5 is electrically (directly or indirectly) connected to the first shield layer 3a and/or the second portion 50b of the flexible shield tube 5 is electrically to both the second shield layer 3b and the third shield layer 3c. Accordingly, a shielding function of the flexible shield tube 5 is particularly achieved.

In this connection, as shown in FIG. 13 and according to a particular fifth step of the splicing method, at least one connecting element 6 configured to mechanically and/or electrically connect the flexible shield tube 5 to the first shielded wire 2a, to the second shielded wire 2b and/or to the third shielded wire 2c is provided. As above described, the connecting element 6 may comprise at least one first adhesive tape 6a and/or at least one second adhesive tape 6b and/or at least one first tie band and/or at least one second tie band, and/or at least one first clamp and/or at least one second clamp. While FIG. 13 illustrates a connecting element 6 comprising the first adhesive tape 6a and the second adhesive tape 6b, the same procedure herein described with respect to the adhesive tape can be adopted if the connecting element 6 comprises the tie bands and/or the clamps.

As illustrated in FIG. 13, the first adhesive tape 6a may be wrapped over at least the portion 520a of the outer surface 52 of the flexible shield tube 5 and over at least a portion of an outer surface 40a of the first outer sheath 4a so as to connect the flexible shield tube 5 to the first shielded wire 2a. In other words, by wrapping the adhesive tape 6a over the flexible shield tube 5 and the first outer sheath 4a, the flexible shield tube 5 can be connected to the first shielded wire 2a.

The second adhesive tape 6b may be wrapped over at least a portion 520b of the outer surface 52 of the flexible shield tube 5 and at least a portion of an outer surface 40b of the second outer sheath 4b and at least a portion an outer surface 40c of the third outer sheath 4c. Accordingly, by wrapping the second adhesive tape 6b over the above portions of spliced cable 1, the flexible shield tube 5 can be mechanically connected to the second shielded wire 2b and to the third shielded wire 2c.

Figure 14:
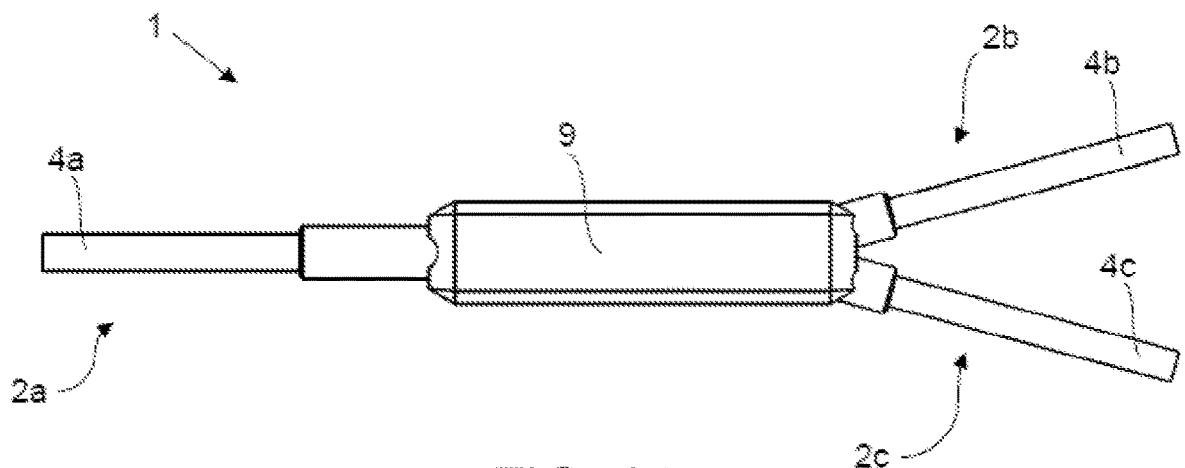
FIG. 14 is a plan view illustrating the method of splicing a cable according to one embodiment of the present disclosure.

Finally, as shown in FIG. 14, according to a particular sixth (optional) step of the splicing method, a waterproofing element 9 may be provided. The waterproofing element 9 may be configured to substantially integrally encase or surround or house the flexible shield tube 5 at the central portion 100c of the spliced cable 1 so as to provide waterproof properties to the spliced cable 1.

Specifically, the waterproofing element 1 may be a waterproof molding. The waterproofing element 9 may be made of a thermoplastic polymer or a thermosetting polymer. For example, the waterproofing element 9 may be made of polyvinyl chloride resin, polyethylene resin or polypropylene resin, or polyurethane resin (PUR). Particularly, the waterproofing element may comprise two or more complementary connectable shells configured to substantially encase the central portion of the spliced cable 1 where the conductors are electrically connected. As shown in FIG. 14, the two complementary shells may be applied over the flexible shield tube 5 encasing the flexible shield tube 5. Once encased by the waterproof case 9, the spliced cable 1 substantially is waterproof.

The invention claimed is:

1. A spliced cable comprising:
   a first shielded wire, wherein the first shielded wire comprises at least one conductor and a first shield layer having an outer surface coated with a first outer sheath;
   a second shielded wire, wherein the second shielded wire comprises at least one conductor and a second shield layer having an outer surface coated with a second outer sheath;
   a third shielded wire, wherein the third shielded wire comprises at least one conductor and a third shield layer having an outer surface coated with a third outer sheath;
   wherein the first conductor is electrically connected to the second conductor and to the third conductor; and
   a flexible shield tube, wherein the flexible shield tube comprises a first portion and a second portion longitudinally adjacent or spaced from the first portion, wherein:
   the first portion of the flexible shield tube is disposed to substantially encase an exposed portion of the first shielded wire and is electrically connected to the first shield layer,
   the second portion of the flexible shield tube is disposed to substantially encase both an exposed portion of the second shielded wire and an exposed portion of the of the third shielded wire and is electrically connected to the second shield layer and the third shield layer,
   the exposed portion of the first shielded wire comprises a portion of the first shield layer where the first outer sheath is stripped so as to expose the outer surface of the first shield layer,
   the portion of the first shield layer where the first outer sheath is stripped is interposed between a couple of portions of the first shield layer that are coated with the first outer sheath,
   an inner surface of the flexible shield tube is disposed to substantially abut the outer surface of the first shield layer at the exposed portion,
   the exposed portion of the second shielded wire comprises a portion of the second shield layer where the second outer sheath is stripped so as to expose the outer surface of the second shield layer, the portion of the second shield layer where the second outer sheath is stripped is interposed between a couple of portions of the second shield layer that are coated with the second outer sheath, an inner surface of the flexible shield tube is disposed to substantially abut the outer surface of the second shield layer at the exposed portion, the exposed portion of the third shielded wire comprises a portion of the third shield layer where the third outer sheath is stripped so as to expose the outer surface of the third shield layer, the portion of the third shield layer where the third outer sheath is stripped is interposed between a couple of portions of the third shield layer that are coated with the third outer sheath, an inner surface of the flexible shield tube is disposed to substantially abut the outer surface of the third shield layer at the exposed portion, and the flexible shield tube comprises an elastically deformable material, so that the inner surface of the flexible shield tube can abut the outer surface of each of the first, second and third shield layers at the exposed portion of a corresponding one of the first, second and third shielded wires.

2. The spliced cable according to claim 1, wherein the flexible shield tube is a braided tube.

3. The spliced cable according to claim 1, wherein the second shielded wire and the third shielded wire are arranged substantially adjacently and/or parallel to each other.

4. The spliced cable according to claim 1, further comprising at least one connecting element, wherein the connecting element is configured to mechanically and/or electrically connect the flexible shield tube to the first shielded wire, the second shielded wire and the third shielded wire.

5. The spliced cable according to claim 4, wherein:
the connecting element comprises at least one first adhesive tape and/or at least one second adhesive tape;
the first adhesive tape is configured to encase at least a portion of the outer surface of the flexible shield tube and at least a portion of an outer surface of the first outer sheath so as to mechanically and/or electrically connect the flexible shield tube to the first shielded wire, and
the second adhesive tape is configured to encase at least a portion of the outer surface of the flexible shield tube and at least a portion of an outer surface of the second outer sheath and at least a portion an outer surface of the third outer sheath so as to mechanically and/or electrically connect the flexible shield tube to the second shielded wire and to the third shielded wire.

6. The spliced cable according to claim 4, wherein:
the connecting element comprises at least one first tie band and/or at least one second tie band;
the first tie band is configured to tie at least a portion of the outer surface of the flexible shield tube so as to mechanically and/or electrically connect the flexible shield tube to the first shielded wire; and
the second tie band is configured to tie at least a portion of the outer surface of the flexible shield tube so as to mechanically and/or electrically connect the flexible shield tube to the second shielded wire and to the third shielded wire.

7. The spliced cable according to claim 4, wherein:
the connecting element comprises at least one first clamp and/or at least one second clamp;
the first clamp is configured to crimp at least a portion of the outer surface of the flexible shield tube and at least a portion of an outer surface of the first outer sheath so as to mechanically and/or electrically connect the flexible shield tube to the first shielded wire, and
the second clamp is configured to crimp at least a portion of the outer surface of the flexible shield tube and at least a portion of an outer surface of the second outer sheath and at least a portion an outer surface of the third outer sheath so as to mechanically and/or electrically connect the flexible shield tube to the second shielded wire and to the third shielded wire.

8. The spliced cable according to claim 1, wherein the flexible shield tube, the first outer sheath, the second outer sheath and the third outer sheath have substantially an equal thickness.

9. The spliced cable according to claim 1, wherein:
the first portion of the flexible shield tube comprises a opening,
the second portion of the flexible shield tube comprises a second opening, and
a surface extension of the first opening is smaller than a surface extension of the second opening.

10. The spliced cable according to claim 1, further comprising:
a waterproofing element, wherein:
the waterproofing element is configured to substantially encase the flexible shield tube, and
the waterproofing element is molded at least onto the flexible shield tube.

11. An electric circuit comprising the spliced cable according to claim 1.

12. A vehicle comprising the electric circuit according to claim 11.

13. A method for splicing a cable, the method comprising:
providing a first shielded wire, wherein the first shielded wire comprises at least a first conductor and a first shield layer having an outer surface coated with a first outer sheath;
providing a second shielded wire, wherein the second shielded wire comprises a second conductor and a second shield layer having an outer surface coated with a second outer sheath;
providing a third shielded wire, wherein the third shielded wire comprises a third conductor and a third shield layer having an outer surface coated with a third outer sheath;
electrically connecting the first conductor to the second conductor and to the third conductor;
arranging a flexible shield tube having a first portion and a second portion longitudinally adjacent or spaced from the first portion such that the first portion of the flexible shield tube substantially encases an exposed portion of the first shielded wire and such that the second portion of the flexible shield tube substantially encases both an exposed portion of the second shielded wire and an exposed portion of the third shielded wire; and
electrically connecting the first portion of the flexible shield tube to the first shield layer and the second portion of the flexible shield tube to both the second shield layer and the third shield layer, wherein:
the exposed portion of the first shielded wire comprises a portion of the first shield layer where the first outer sheath is stripped so as to expose the outer surface of the first shield layer, the portion of the first shield layer where the first outer sheath is stripped is interposed between a couple of portions of the first shield layer that are coated with the first outer sheath, an inner surface of the flexible shield tube is disposed to substantially abut the outer surface of the first shield layer at the exposed portion, the exposed portion of the second shielded wire comprises a portion of the second shield layer where the second outer sheath is stripped so as to expose the outer surface of the second shield layer, the portion of the second shield layer where the second outer sheath is stripped is interposed between a couple of portions of the second shield layer that are coated with the second outer sheath, an inner surface of the flexible shield tube is disposed to substantially abut the outer surface of the second shield layer at the exposed portion, the exposed portion of the third shielded wire comprises a portion of the third shield layer where the third outer sheath is stripped so as to expose the outer surface of the third shield layer, the portion of the third shield layer where the third outer sheath is stripped is interposed between a couple of portions of the third shield layer that are coated with the third outer sheath, an inner surface of the flexible shield tube is disposed to substantially abut the outer surface of the third shield layer at the exposed portion, and the flexible shield tube comprises an elastically deformable material, so that the inner surface of the flexible shield tube can abut the outer surface of each of the first, second and third shield layers at the exposed portion of a corresponding one of the first, second and third shielded wires.

14. The method for splicing a cable according to claim 13, the method further comprising:

providing at least one connecting element to mechanically and/or electrically connect the flexible shield tube to the first shielded wire, and providing at least one connecting element to mechanically and/or electrically connect the flexible shield tube to both the second shielded wire and to the third shielded wire.

* * * * *